Jan. 30, 1962 D. M. LIPKIN 3,019,348

TRANSVERSE MAGNETIC AMPLIFIER CORE CONSTRUCTION

Filed March 17, 1955 4 Sheets-Sheet 1

*INVENTOR.*
DANIEL M. LIPKIN

William Gorman

AGENT

TRANSVERSE MAGNETIC AMPLIFIER CORE CONSTRUCTION

Filed March 17, 1955 4 Sheets-Sheet 2

INVENTOR
DANIEL M. LIPKIN
William Grobman
AGENT

TRANSVERSE MAGNETIC AMPLIFIER CORE CONSTRUCTION

Filed March 17, 1955 4 Sheets-Sheet 3

INVENTOR
DANIEL M. LIPKIN

William Grobman

AGENT

INVENTOR
DANIEL M. LIPKIN
William Grobman
AGENT 3,019,348
Patented Jan. 30, 1962

3,019,348
TRANSVERSE MAGNETIC AMPLIFIER CORE CONSTRUCTION

Daniel M. Lipkin, Philadelphia, Pa., assignor to Remington Rand Inc., Philadelphia, Pa., a corporation of Delaware Filed Mar. 17, 1955, Ser. No. 494,904
4 Claims. (Cl. 307—88)

The present invention concerns the construction of transverse magnetic amplifiers and cores therefor of the so-called "postage stamp" type and the method of their assembly.

It is an object of the invention to provide an improved structure for transverse ferro-magnetic amplifiers.

It is an object of the invention to provide means for the mass production of transverse magnetic amplifier elements in a speedy and inexpensive manner.

Reference is made to copending application Serial No. 494,903, filed March 17, 1955, for "Transverse Magnetic Amplifier" of Daniel Lipkin; for a detailed discussion on transverse magnetic amplifiers in connection with the present invention. Among the magnetic materials that may be used in this invention are ones having a rectangular hysteresis loop.

In the drawings, like numerals refer to like parts throughout.

The invention of the present application, which forms one of a group filed of even date herewith, with a single exception, is primarily concerned with the actual construction of several core structures for use in ferro-magnetic amplifiers.

The basic considerations concerning transverse devices comprising the present invention may be formulated as follows:

(1) Transverse fields are in general applied to a core of ferro-magnetic material simultaneously. It may be noted that the B-H relationships are quantitatively unknown except under the conditions to be described below.

(2) It is possible by means of the invention to obtain quantitatively predictable B-H relationships in transverse core structures, consisting in the resultant B vector being a simple mathematical function of the resultant H vector.

(3) The above is accomplished by observing strictly the condition that the scalar magnitude of the vector resultant magnetizing force be kept above a predeterminable level characteristic of the magnetic material.

A. When the above condition is met, the vector flux density B is substantially given by the vector equation:

$$\vec{B}=\frac{B_s\vec{H}}{h} \quad (1)$$

where $B_s$ is the saturation flux density magnitude for the material; $\vec{H}$ is the resultant magnetizing force vector in the material; and $h$ is the scalar magnitude of $\vec{H}$. The above equation states that $\vec{B}$ is in the same direction as $\vec{H}$ and has the fixed magnitude $B_s$. This relationship is justified and occurs when the above condition is satisfied.

B. When Equation 1 is satisfied, the core itself does not absorb or store energy even temporarily, but merely serves to transfer energy between the sources of the transverse fields, yielding loss-less operation.

(4) Condition 3 above is met by having at least two transverse fields satisfying the condition:

$$h \geqslant hp \quad (2)$$

where $hp$ is the predeterminable level referred to in 3 above.

(5) In a practical embodiment, a transverse magnetic structure, constructed in accordance with the foregoing considerations, would comprise a body of magnetic material having magnetizing means associated therewith and adapted to impress mutually orthogonal fields on the said body. An output effect may be produced from such a transverse structure by varying the magnitude of at least one of the transverse fields and, so long as the condition represented by Equation 2 is satisfied, the operation of the device will be substantially loss-less.

(6) The predeterminable level $hp$ referred to above may be taken to be that value of magnetizing field larger than the value at which the specific rotational hysteresis loss for the material peaks (see FIGURE 1) and for which the specific rotational hysteresis loss is appreciably less than said maximum rotational hysteresis loss.

Figure 1:
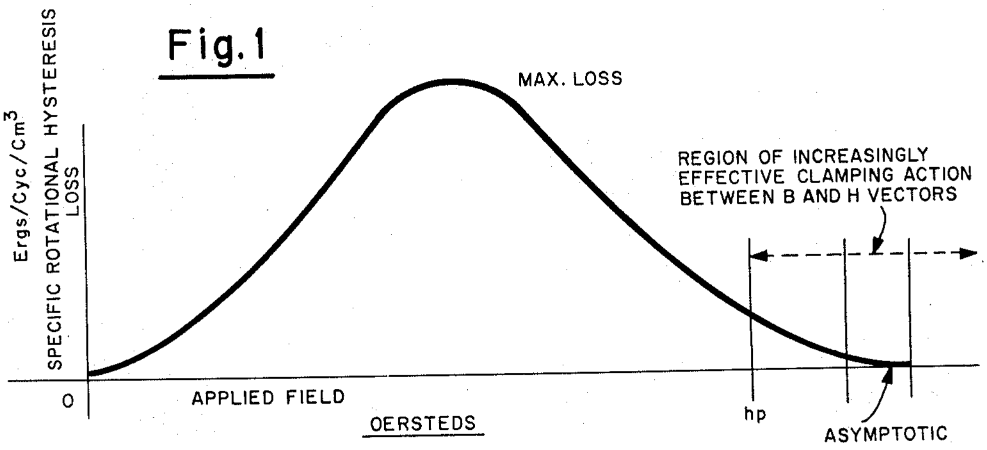
FIGURE 1 is a generalized hysteresis loss diagram.

As shown in FIGURE 1, the hysteresis loss in a magnetic material increases to a maximum. As the resultant moving magnetic field increases beyond that required for saturation, the region of vanishing rotational hysteresis loss is reached and any changes of magnetization of the core will take place without storage or irreversible loss of energy in the core or shell. The curve of FIGURE 1 is not necessarily symmetrical, but starts near the origin, passes through a more or less critical maximum and is asymptotic to the "X" axis as the field increases. The region we are here concerned with lies to the right of the maximum. Of course, the power required to produce and maintain fields of such magnitude is itself a limiting factor.

The transverse magnetic cores of the character under consideration should be operated at the highest practicable frequencies. Such a core of practical dimensions, if operated in the region of 50 megacycles, requires a high power level. This consideration can be met by minimizing the amount or rather volume of ferro-magnectic material in the body of the core. Such a core may comprise a ferrite tube prepared by molding a thin layer of ferrite onto the outside of a magnetically inert steatite tube, or a metallic ferro-magnetic core may be constructed of relatively wide tape.

Figure 2:
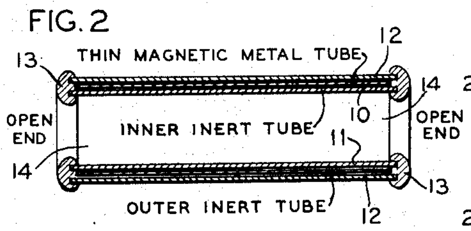
FIGURE 2 is a cross-section of one form of transverse magnetic amplifier according to the invention.

In FIGURE 2, ferro-magnetic metal 10 such as pure iron, nickel or alloy with molybdenum, cobalt, aluminum, tungsten, chromium, or related metals, may be rolled into thin leaf form or sprayed, plated or evaporated in a thin layer on the outside of a tube 11 of steatite or other magnetically inert material. The film of magnetic material is then covered by an outer inert tube 12. Again, the magnetic film may be deposited on the inside of the outer inert tube 12 and protected by the insertion of the inner tube 11. As a production method, the magnetic metal could be deposited on a third tube as a support and inserted between two tubes 11 and 12. The two tubes 11 and 12 are then sealed by wax or similar means 13. The magnetic material 10 may be maintained in a vacuum or a selected atmosphere between the two annular seals 13 which provide a clear center hole or channel 14 through the inner tube 12 for the insertion of magnetization wires.

Figure 3:
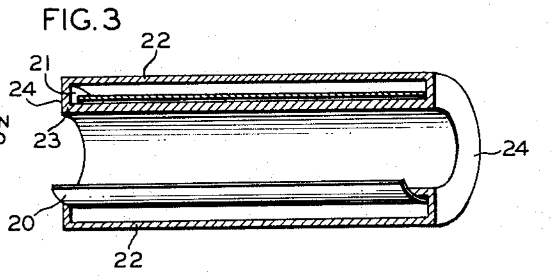
FIGURE 3 is a sectional elevation of a second form the invention may take.

In FIGURE 3 ferro-magnetic material, in the form of a sheet 20, may be a scroll with ends loosely overlapping, abutting or fastened together to form a cylinder as may be desired. The curled or cylindrical sheet 20 is inserted into the cylindrical space 21 between concentric tubular cylinders 22, 23 of inert material with their ends sealed as at 24. Here again the two cylinders may be made of steatite, glass or the like, and filled with an inert gas or evacuated. This form of the device might be termed a magnetic vacuum tube.

Figure 4:
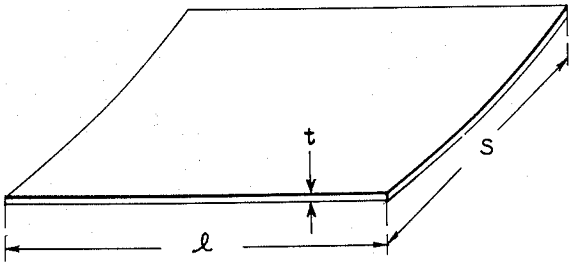
FIGURE 4 is an elemental section of core material.

In FIGURE 4 is shown a small element of flattened magnetic material similar to cylinder 10 or scroll 20. This material is subject to magnetizations in each of two mutually perpendicular directions simultaneously, but in its scroll form would not present a fully closed magnetic path of high permeability throughout to either of these possible magnetizations. Scroll 20 differs in this respect from the toroidal shell of Serial No. 499,924, now Patent No. 2,825,869, which provides closed high permeability paths for both magnetizations.

The length and width of scroll 20 should be great enough when "unrolled" so that both magnetic paths encounter no serious demagnetizing effects. Assuming the dimensions shown in FIGURE 4 and the effective permeability of the material of FIGURE 3 to be $\mu$:

$$\frac{\pi l^2}{2ts} >> \mu$$

$$\frac{\pi s^2}{2tl} >> \mu$$

with a ratio of about five to one $$\frac{\pi l^2}{2ts} \approx \frac{\pi s^2}{2tl} \approx 5\mu$$

$$\frac{l^2}{ts} \approx \frac{s^2}{tl} \approx 3\mu$$

$$\frac{s}{t} \gtrapprox 3\mu \quad \frac{l}{2} \gtrapprox 3\mu$$

Taking the element of FIGURE 4 as a square of 4–79 Moly-permalloy, an upper bound for $\mu$ may be determined. The effective maximum permeability observed empirically in transverse magnetizations may be expressed as the ratio of saturation induction over the direct current bias required to establish vanishing rotational hysteresis or effectively to eliminate hysteresis. This may be expressed as:

$$\mu - \frac{B_S}{H_B}$$

For 4–79 Moly-permalloy, $B_S$ may be taken as 7000 gauss, and coercive force $H_C$ about 0.15 oersted. As stated in the applications referred to above, the field applied to give vanishing hysteresis is of the order of ten to twenty times the resultant of the supersaturating magnetic field $H_S$, making $H_B$ about 3 oersteds if the upper value is used. Substituting these values, a usable value of $\mu$ would be 2000. In FIGURE 3, $t$ may be taken as ⅛ mil and eddy currents regarded serious at $$\frac{10^9 \rho}{4\mu} \approx \frac{10^9}{4 \times 2000 \times 8} \approx 6 \text{ mc.}$$

Accordingly, 3 mc. would permit operation without serious eddy current loss.

The side of the square of FIGURE 4 would therefore need to be at least $$3\mu t \text{ or } 3 \times 2 \times \frac{1}{8000} = 0.75''$$

or just over 2 cm. This is a very convenient size. The volume of such a sheet or scroll would be about $$2^2 \times \frac{1}{8000} 2.54 \approx 1.25 \times 10^{-3} \text{ cm}^3.$$

It may be seen that a decrease in size and volume of the scroll or sheet 20 or 10, might be acceptable if a bias of much higher value was used. Permeability could be reduced to 50 and still be useful although frequency would be raised.

Figure 5:
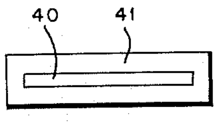
FIGURE 5 is an end view of the "postage-stamp" type of ferro-magnetic core.
Figure 6:
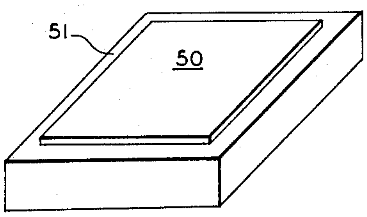
FIGURE 6 is a perspective view of an intermediate form, or if desired, a modified form of the ferro-magnetic core of FIGURE 4.

From the above, it would appear that no serious demagnetization effects are apparent in a sheet of Permalloy tape ⅛ mil thick and 0.75 in. square, when the effective permeability has been reduced to 2000 or less by means of a transverse bias. Therefore, the scroll 20 could be left flat like a postage stamp, as shown in FIGURES 5 and 6. Postage stamp cores 1 cm. square would decrease the volume by a factor of four and permit the use of higher radio frequencies. This size is practical and will be employed in later consideration of the problem.

The "postage stamp" ferro-magnetic core may comprise a magnetic core 40 embedded or encased in a coating or protective block of inert plastic of lucite, one of the methacrylates, cellulose base plastic or the like 41, shown in section in FIGURE 5. Again, a core 50 may be mounted on a plastic protective wafer 51 which may be provided with an upper part, removable as a box top or integral, to give the effect shown in FIGURE 6.

The structure of FIGURE 6 may be produced by selecting a flat block of steatite 51 or any other dimensionally stable insulator, and cementing a thin slab 50 of the ferrite material to it, making sure that the mating surfaces are accurately flat. This combination is fixed in a surface grinder and the ferrite 50 reduced to the desired thickness. If desired, another slab of steatite can be affixed to the finished ferrite for protective purposes. If the ferrite thickness is of the order of 0.001" and that of the steatite 0.20", the proportion of "air" to ferrite cross-sectional area in the coils wound on the combined slabs will not be so great as to interfere materially with the core operation. This is especially true in transverse magnetic amplifiers because the important coupling is between the transverse coils and is due only to the oscillation of the flux in the ferrite material.

Figure 7:
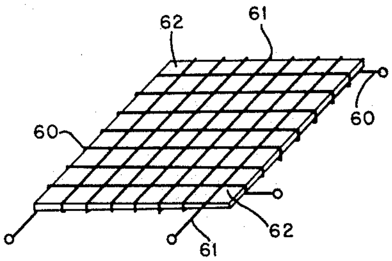
FIGURE 7 is a perspective view of one basic form of "postage stamp" core.

In FIGURE 7 is shown one method of winding two coils 60 and 61, having mutually perpendicular magnetic fields, on a core of magnetic material 62 just discussed. After the winding of coils 60 and 61, the entire assembly of FIGURE 6 may be dipped, sprayed or molded into the form shown in FIGURES 5 and 6 or other arrangements such as FIGURE 10 and the like. In order to decrease the effective capacity between windings, the "potting" dipping, spraying or other application of plastic material can be done in steps, at least once between winding coils 60 and 61. In this manner a certain amount of plastic can be inserted between the coils particularly if time is allowed for setting.

There is at least one reason why the cores 40 and 50 might be made circular. This shape would ensure that as the saturated B vector rotates or oscillates in phase with the magnetizing field, the demagnetization factor encountered would be a constant.

Figure 8:
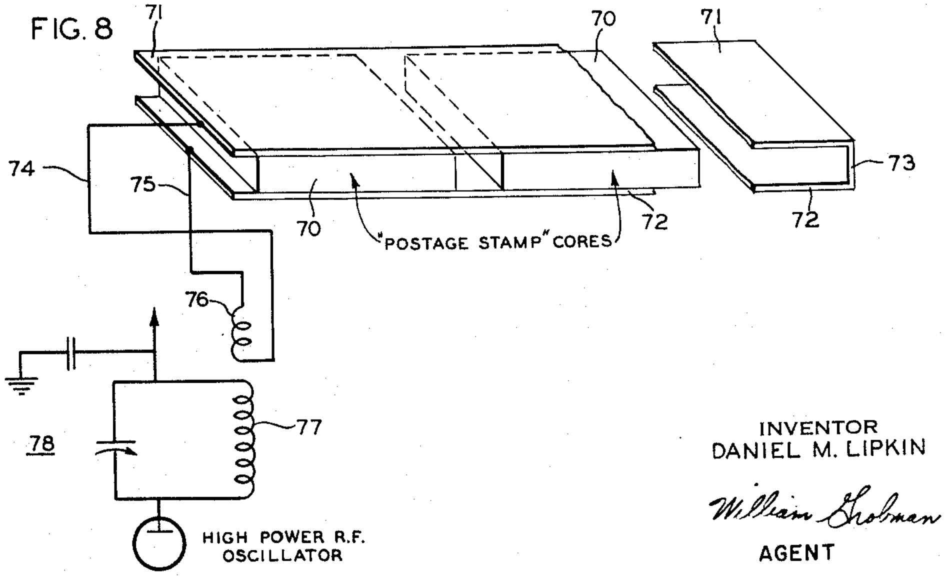
FIGURE 8 is a schematic fragmentary view of one form of apparatus for making transverse magnetic amplifier cores employing only radio frequency.

The radio frequency magnetization of a number of this type of core may be accomplished as shown in FIGURE 8 in which magnetic cores 70 are placed between copper straps 71, 72 having the same width as the cores. Straps 71 and 72 may be connected electrically or constructed integrally as at 73. Wires 74, 75 connect straps 71, 72 to a link or coil 76 which is coupled with the plate tank 77 of a high powered radio frequency oscillator 78.

A current of about fifty amperes in copper straps 71, 72 about one cm. wide would produce a magnetic field of about thirty to sixty oersteds between the straps. To test the practicability of the structure of FIGURE 7, straps 71, 72 may be taken as a hundred cm. long each, one cm. wide and spaced about 2 mm. apart.

$$L=8\pi\ 10^{-8}\ H=.08\pi\ \mu H=0.25\ \mu H$$
$$\omega L=5.5\Omega \text{ at } 3.5 \text{ mc.}$$

The thickness of current carrying skin in copper at 3.5 mc. is $$\frac{1}{2\pi}\sqrt{\frac{10^9\rho}{8}}=.00364 \text{ cm.}=1.4 \text{ mils}$$

Effective resistance of the copper strip 71, 72, 73 at least 3 mils thick will be about 0.05 ohm. Therefore the "Q" of the strap will be about 100 at 3.5 mc. and the size of capacitor required to resonate the strap at 3.5 mc. is 8260 $\mu\mu$fd.

If a peak field of ten oersteds is selected, a peak *i* of $$\frac{50\times 10}{60}\approx 8$$

amperes will be required, causing a copper loss of 1.6 watts.

In FIGURE 8 the capacitance between straps 71 and 72 under the above conditions is about 44 $\mu\mu$fd., yielding a reactance at 3.5 mc. of 1030 ohms. This value is not objectionable in any way.

Figures 9, 9A, 10, 11:
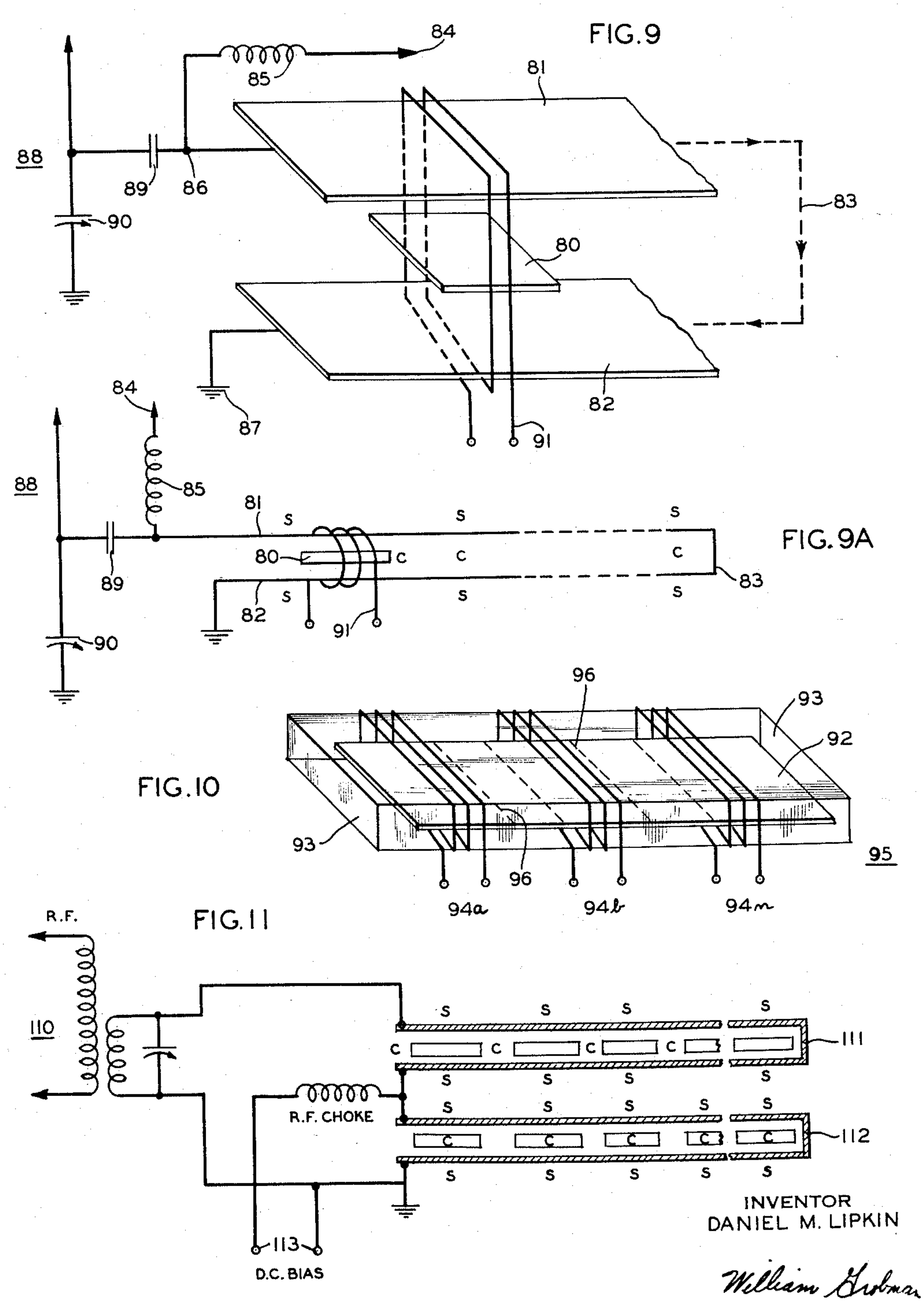
FIGURE 9 is a schematic fragmentary exploded view of another form of apparatus for making transverse magnetic cores using a radio frequency bias and one signal winding.
FIGURE 9A is a simplified circuit diagram representative of the apparatus of FIGURE 9.
FIGURE 10 is a perspective view of another form of transverse magnetic core structure.
FIGURE 11 is a schematic view partly in section of one form of apparatus for mass producing cores.

In FIGURE 9, an exploded view of an arrangement is presented in which direct bias current can be sent through the same copper straps that carry the radio frequency current. The signal input and the output coils for the transverse magnetization amplifier would then be wound around the individual "postage stamp" cores in such a direction as to encircle the copper straps. A plurality of cores 80 are positioned between straps 81, 82 joined at 83. A grounded source of direct current bias is applied at 84 to one terminal of heavy radio frequency choke coil 85, the other terminal of the coil being connected to outgoing copper strap 81 at 86. Return strap 82 is grounded at 87. A radio frequency source 88 is connected through direct current blocking condenser 89 to junction 86. The link tank condenser 90 is coupled to or forms part of the vacuum tube plate tank of the radio frequency oscillator 88. The coil 91 illustrates the direction of winding of both the signal "input" and "output" coils.

For simplicity in consideration, the apparatus of FIGURE 9 can be represented as shown in FIGURE 9A which shows a simplified diagram. C denotes a series of postage stamp cores 80 sandwiched between portions S of straps 81, 82.

If desired, the various magnetic elements or "cores" need not be separated pieces of metal, but a single long strip of metal or magnetic material could be used. Cores such as "C" would be localized in the strip by windings at appropriate intervals. In FIGURE 10 a long strip of metal or magnetic material 92 is embedded in a protective enclosure 93 of plastic or the like. Representative coils 94a, 94b, 94n are spaced apart sufficiently to avoid interference, cross-talk or the like. The strip 95 can be inserted between the straps in FIGURES 8 and 9, carrying radio frequency for operation in transverse magnetization. Where the parts between dotted lines 96 are omitted, the actual postage stamp structure is again utilized and completely separated cores obtained. A large number of separate squares or circles of magnetic material may be contained in or mounted on a single long magnetic tape, providing mechanical connection and ease of handling without danger of interference or cross-talk.

Wherever a single tape or piece of thin magnetic strip having a plurality of individual cores is used, it will be understood that a stack of such tapes or strips can be employed instead. In this case if the material is metal the individual tapes or strips comprising a single stack should be insulated to minimize eddy currents. However, in the construction of FIGURES 8 and 9, the circuit used fixes and determines a certain definite relation between the directions of the radio frequency and direct current bias conductors for all the postage stamp cores of the particular construction, because the copper straps are the same conductor for both. Therefore, where it is desired to "stack" the cores, the constructions of FIGURES 11, 11A, and 12 are employed.

In FIGURE 11 two separate copper straps 100 and 101 are used with the direct current bias 102 applied thereto in opposing directions relative to the radio frequency current supply 103. Radio frequency by-pass condensers 104 and 105 as well as a radio frequency choke coil 106 are employed in the radio frequency and D.C. bias circuits respectively. The cores C within the dotted line 107 show two "paired" cores within a single amplifier.

Figures 11A, 12A, 12B, 12C:
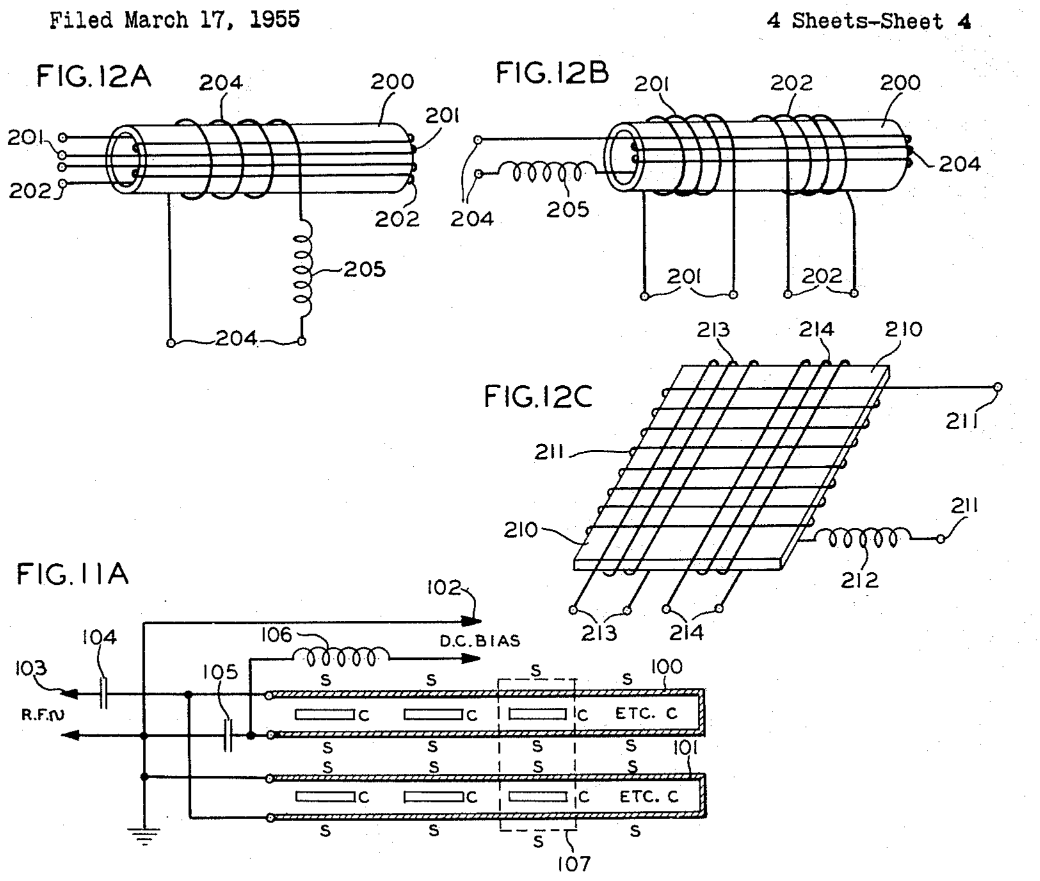
FIGURE 11A is a variant form of the device of FIGURE 11.
FIGURES 12A, 12B and 12C illustrate three presently preferred forms of wound transverse magnetic cores according to the invention.

In FIGURE 11A is shown a modified two-strap circuit. Here, however, the radio frequency currents from R.F. source 110 flow through the straps 111 and 112 in series. It will be seen that the direct current relation of bias source 113 is opposite to the radio frequency current in one strap 111 as compared with the relation in the other strap 112, as the direct current bias flows through the straps in parallel.

Figure 11B:
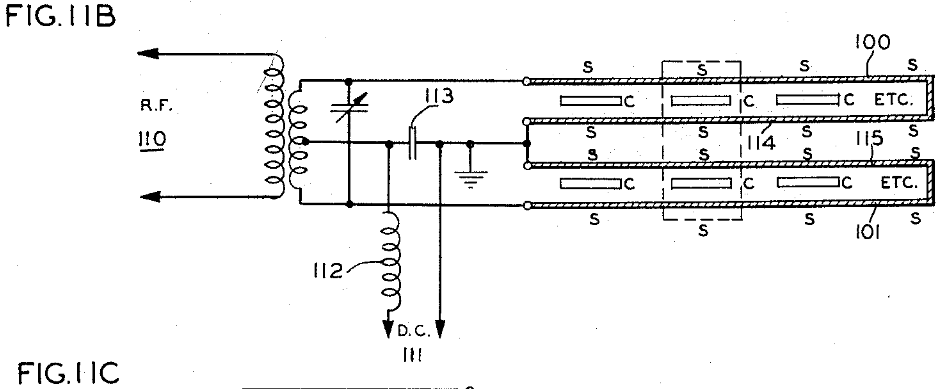
FIGURES 11B and 11C are modifications of the form of FIGURE 11 employing radio frequency and direct current bias.

FIGURE 11B shows a push-pull circuit applied to the double strap structure of FIGURE 11A. The radio frequency source 110 and direct current bias 111 is as above. The choke coil 112 is shown, but in some circumstances may be eliminated. In the structure of FIGURE 11B the two middle strap portions 114 and 115 can be combined into a single strap, making a three-strap system.

Figure 11C:
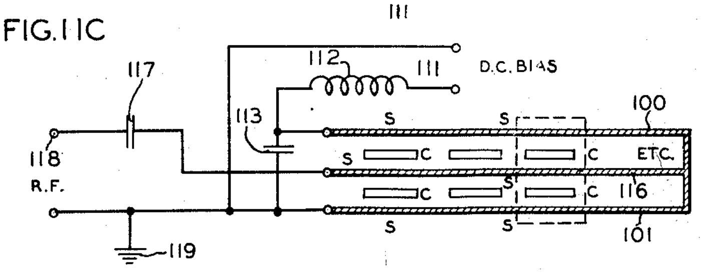

A variant of the three-strap arrangement appears in FIGURE 11C where the adjacent strap walls 114 and 115 are combined as 116. Choke 112 may be eliminated in some cases. Condenser 113 blocks D.C. flow and condenser 117 provides an R.F. path. Radio frequency source 118 is grounded at 119.

In view of the linearized analysis set forth in some detail in Serial No. 494,903, the following equation may be written:

$$B_1=\frac{B_s x}{\sqrt{Hx^2}}\left[1-\left(\frac{H_A}{H_O}\frac{x\sqrt{1+x^2}}{\sqrt{Q^2+(1+x^2)^3}}\right)\sin\left(\omega t-\tan^{-1}\left[\frac{Q}{(1+x^2)^{3/2}}\right]\right)\right]$$

The coefficient of the sinusoidal term may be expressed as $$\left[y\frac{H_A}{H_O}\frac{\sqrt{1+x^2}}{x}\right]$$

which, with $x=1.5$, $Q=2$ and $$\frac{H_A}{H_O}=0.70$$

giving $y=0.362$, permits an evaluation of the coefficient as $\approx 0.30$ and substantiates the assumption of small flux serving as a valid approximation.

From these data various forms of a type of semi-linear mutual inductor embodying the invention may be reliably worked out for use in digital computers and related or similar applications in which two coils are wound on a core upon which is impressed a large transverse bias supplied from a fixed source of direct current containing a large inductance, the D.C. bias being large enough to place the core material in a state in which energy loss by absorption or energy storage is negligible.

Semi-linear mutual inductors of the kind referred to and suitable for use as transverse ferro-magnetic amplifiers, are illustrated in FIGURES 12A, 12B and 12C.

A cylindrical core 200 of ferro-magnetic material may be supplied with a first winding 201 and a second winding 202 threading the central channel 203 of the core, as shown in FIGURE 12A. Windings 201 and 203 are coupled windings. A helical winding 204 is wound around the outside of the core cylinder transversely of the first two windings and supplied with a large D.C. bias. Winding 204 has a large inductance 205 in its circuits.

In FIGURE 12B the relationship of the windings with respect to the core is reversed as may be seen by the positions and retained numbering.

FIGURE 12C shows a third form of inductor as a transverse magnetic amplifier in which a thin square strip of ferro-magnetic material 210 is provided with first and second coupled windings 213 and 214, and an orthogonal D.C. bias winding 211 with a large choke coil 212. Core 210 may be circular or elliptical in shape, if desired, as mentioned above.

In general transverse magnetization amplifiers may be modified in several basic ways.

(1) The bias current may be omitted. For no input, the amplifier will still give no output, although the core will dissipate power as a hysteresis loss at the auxiliary radio frequency. The application of a signal to the input will produce an output at twice the auxiliary radio frequency.

(2) The output winding of a transverse magnetization amplifier can be tuned. The tuning referred to is not for the purpose of producing frequency sensitivity, but serves the purpose of decreasing undesirable reactances at the auxiliary frequency. These reactances would otherwise reduce the output obtainable or at least limit the permissible output loading. As the output circuit contains some pure inductive reactance, the addition of a capacitor would eliminate part of the reactance by resonance at the auxiliary radio frequency. Tuning is achieved by placing a suitable condenser in series or in parallel with the output load resistor.

(3) The orthogonal coils, which for convenience may be termed "$x$-coils" and "$y$-coils," are interchangeable without altering the operation of a transverse magnetic amplifier, provided the conductors previously wound as $x$-coils are wound as $y$-coils and vice versa.

While there have been described above what are presently believed to be the preferred forms of the invention, it will be understood that other forms of the invention will be suggested to those skilled in the art. All such forms as fall within the true spirit of the invention are intended to be covered by the appended claims.

I claim:

1. In a transverse ferro-magnetic amplifier core structure, the combination of a thin wafer of ferro-magnetic material, a metallic sheet on each side of said wafer, said sheets being connected at one end, a winding around said sheets with said wafer therebetween, terminals for said winding, one end of said sheets having an electrical circuit connected thereto comprising a radio frequency choke coil having a direct current bias source connected thereto, a blocking condenser and radio frequency current source, said circuit being connected to the other end of said connected sheets, the resultant magnetic field produced by the simultaneous action of said D.C. bias and radio frequency current with the current in said winding being such as to operate said core in the region of vanishing rotational hysteresis loss.

2. The combination set forth in claim 1, and further comprising a plurality of said wafers in side-by-side relation between said sheets and a separate winding for each wafer.

3. A magnetic device comprising a thin, continuous magnetic element, first winding means magnetically linking said element with respect to one magnetic direction thereof, and a plurality of additional winding means linking said element with respect to another transverse magnetic direction thereof and at locations sufficiently spaced therealong to be substantially isolated magnetically, said element terminating non-magnetically along said transverse direction, and the dimension of said sheet along said transverse direction being at least hundreds of times the thickness of said sheet so as to produce negligible demagnetization effects.

4. A magnetic device comprising a plurality of thin magnetic elements spaced magnetically along a first direction, a first common winding magnetically linking each of said elements with respect to said first direction, a plurality of windings magnetically linking said elements respectively with respect to a second direction transverse to said first direction, the dimensions of said elements in both said directions being hundreds of times the thickness of said elements so as to produce negligible demagnetization effects.

References Cited in the file of this patent

UNITED STATES PATENTS

| | | |
|---|---|---|
| 76,654 | Page | Apr. 14, 1868 |
| 1,504,882 | Elmen | Aug. 12, 1924 |
| 1,553,983 | Casper | Sept. 15, 1925 |
| 1,779,269 | Clough | Oct. 21, 1930 |
| 1,905,216 | Capps | Apr. 25, 1933 |
| 2,543,843 | Frosch | Mar. 6, 1951 |
| 2,650,350 | Heath | Aug. 25, 1953 |
| 2,724,103 | Ashenhurst | Nov. 15, 1955 |
| 2,784,391 | Rajchman et al. | Mar. 5, 1957 |
| 2,792,563 | Rajchman | May 14, 1957 |
| 2,917,238 | Blizard | Dec. 15, 1959 |

FOREIGN PATENTS

| | | |
|---|---|---|
| 316,173 | Italy | Mar. 24, 1934 |
| 592,241 | Great Britain | Sept. 11, 1947 |

OTHER REFERENCES

Abstract, Langsdorf, Ser. No. 212,266, published in O.G. June 30, 1953.

UNITED STATES PATENT OFFICE
CERTIFICATE OF CORRECTION

Patent No. 3,019,348 January 30, 1962

Daniel M. Lipkin

It is hereby certified that error appears in the above numbered patent requiring correction and that the said Letters Patent should read as corrected below.

In the grant, lines 2 and 3, for "assignor to Remington Rand Inc., of Philadelphia, Pennsylvania, a corporation of Delaware," read -- assignor, by mesne assignments, to Sperry Rand Corporation, of New York, N. Y., a corporation of Delaware, --; line 12, for "Remington Rand Inc., it successors" read -- Sperry Rand Corporation, its successors --; in the heading to the printed specification, lines 4 to 6, for "assignor to Remington Rand Inc., Philadelphia, Pa., a corporation of Delpware" read -- assignor, by mesne assignments, to Sperry Rand Corporation, New York, N. Y., a corporation of Delaware --.

Signed and sealed this 4th day of September 1962.

(SEAL)
Attest:

ERNEST W. SWIDER
Attesting Officer

DAVID L. LADD
Commissioner of Patents